United States Patent
Kindel et al.

(10) Patent No.: US 7,316,826 B2
(45) Date of Patent: Jan. 8, 2008

(54) COFFEE AROMA WITH IMPROVED STABILITY

(75) Inventors: Guenter Kindel, Hoexter (DE);
Gerhard Krammer, Holzminden (DE);
Stephan Trautzsch, Holzminden (DE)

(73) Assignee: Symrise GmbH & Co. KG, Holzminden (DE)

( * ) Notice: Subject to any disclaimer, the term of this patent is extended or adjusted under 35 U.S.C. 154(b) by 709 days.

(21) Appl. No.: 10/484,229

(22) PCT Filed: May 27, 2002

(86) PCT No.: PCT/EP03/05542

§ 371 (c)(1),
(2), (4) Date: Jan. 16, 2004

(87) PCT Pub. No.: WO03/101216

PCT Pub. Date: Dec. 11, 2003

(65) Prior Publication Data

US 2004/0202767 A1    Oct. 14, 2004

(30) Foreign Application Priority Data

May 31, 2002 (DE) .............................. 102 24 083

(51) Int. Cl.
*A23L 1/22*   (2006.01)

(52) U.S. Cl. ...................................... 426/534; 426/535
(58) Field of Classification Search ................ 426/534, 426/535, 536, 537, 538, 594, 595, 650
See application file for complete search history.

(56) References Cited

U.S. PATENT DOCUMENTS

| 3,962,321 A | 6/1976 | Parliament et al. |
| 4,001,454 A | 1/1977 | Jindra et al. |
| 4,092,334 A | 5/1978 | Mookherjee et al. |
| 5,580,593 A | 12/1996 | Liu et al. |

FOREIGN PATENT DOCUMENTS

| WO | WO 95 11595 | 5/1995 |

OTHER PUBLICATIONS

Semmelroch P et al, "Analysis of Roasted Coffee Powers and Brews by Gas Chromatography-Olfactometry of Headspace Samples", Lebensmittel Wissenschaft und Technologie, Academic Press, London, GB.

*Primary Examiner*—Leslie Wong
(74) *Attorney, Agent, or Firm*—Akerman Senterfitt

(57) ABSTRACT

Process, in order to impart to foodstuffs an aroma of fresh ground and fresh brewed coffee, wherein the aroma substances necessary for imparting the aroma impression of fresh brewed or fresh ground coffee are produced in separate formulations and recombined for use in food stuffs or perfumery products.

9 Claims, No Drawings

US 7,316,826 B2

COFFEE AROMA WITH IMPROVED STABILITY

CROSS REFERENCE TO RELATED APPLICATION

This application is a national stage of PCT/EP03/05542 filed May 27, 2003 and based upon DE 102 24 083.3 filed May 31, 2002 under the International Convention.

BACKGROUND OF THE INVENTION

1. Field of the Invention

The present invention is concerned with aromatic compositions capable of imparting to foodstuffs an aroma of coffee and coffee containing drinks, in particular that of fresh ground and fresh brewed coffee drinks, and of which the stability is in the framework of the customary commercial minimum stability timeframe. The invention is further concerned with foodstuffs and in particular instant or dry products, which are aromatically enhanced with this type of composition. The invention is further concerned with aromatic compositions which are capable of imparting room space and/or objects with an aroma of fresh ground or fresh brewed coffee.

2. Description of the Related Art

There is always a need for new aromatic compositions, in order to impart to foodstuffs desired aromas or to intensify, improve or modify the existing aroma of foodstuffs. The requirements placed on the these aromatic compositions are, besides an authentic aroma profile corresponding to that which is expected, in particular also a shelf life and stability of the aromatic characteristics in a foodstuff product for the minimum conventional shelf life timeframe which is expected in commerce for the foodstuff. This type of aromatic composition in the realm of fresh brewed or fresh ground coffee can be of the roasted, sweet, coco-like, caramel-like or black roasted type. There is a great need for a stable aroma of fresh ground and fresh brewed coffee, such as regular coffee, cappuccino or espresso, but this has until now proven itself difficult to achieve.

WO 00/69274 describes the conventional employment of coffee aroma and coffee extract in drink applications. The separate storage of aroma and concentrate improves the stability of the total system. It is however known that coffee aromas in particular in liquid applications have only a limited stability.

In KR-A 8802027 a process is described for the production of an aromatic fraction of coffee extract and its use for instant drinks. Therein freeze-dried coffee extract and the spray-dried aromatic fraction are employed in combination for improving the aroma characteristics of instant drinks with coffee aroma.

For the production of aromatic mixtures which evoke the sensorial impression of fresh brewed coffee it is necessary to use various aromatic substances from varying chemical substance classes. Single aromatic components are not suited for imparting to a foodstuff an authentic and complete coffee aroma. Within mixtures, individual aromatic substances take part preferentially in chemical reactions. These reactions result in a reduced storage stability and reduced stability of the coffee aroma compositions. This applies both to the formulation with a liquid carrier as well as in the formulation as a dry aromatic.

In the publication of Mayer, Czerny and Grosch (Eur. Food Res Technol. 2000, 211, 272-276) it was described that approximately 25 aromatic effective individual components have been identified within the typical aroma of roast coffee beans. The authors described that by mixing together at least 24 of these components the aroma of coffee can be simulated. The liquid aromatic produced in this manner is characterized by low stability, in particular also when based on the conventional carrier systems. Already after a short time the typical coffee notes are lost. During the course of storage of this replicate false notes evolve, which can be characterized as foul, chemical and burned.

There is thus a need for a simple aromatic composition, which is capable of imparting to foodstuffs, over the commercial minimum required storage stability requirement, an aroma of coffee and coffee containing drinks, in particular of fresh ground and fresh brewed coffee drinks. Preferably the aroma composition should contain fewer than 24 aroma compounds and be stable for longer than 6 months, more preferably longer than 12 months, and particular preferably longer than 18 months.

Similarly, there is a need for foodstuffs which are aromatized or fragrance enhanced with a mixture of aroma components, such that the resulting product exhibits a taste or an aroma of fresh ground and fresh brewed coffee, coffee macchiato, cappuccino or espresso.

The predominant feature of the present invention is a multi-component aromatic composition for imparting a coffee aroma, including the following aromatic substances of Group I:
1a) 2,3-Methylfuranthiol
1b) Furfurylthiol
1c) Methane thiol
1d) 3-Methyl-2-buten-1-thiol (Prenylthiol)
1e) 3,3-Methylthiobutylformate as well as one or more components separate from the aroma substances of Group I, for example components of the following aroma substances of Group 2:
2a) 3-Methylthiopropanal
2b) o-Methylthiophenol (Thioguaiacol)
2c) 2-Acetyl-2-thiazoline (Acetylthiazoline)
2d) 2-Acetylthiazol the following aroma substances of Group 3:
3a) 2-Methylbutanal
3b) 3-Methylbutanal
3c) 2,3-Butandione
3d) 3,5,2-Methyldiethylpyrazine
3e) 2-Ethyl-3,5-dimethylpyrazine und/or 2-Ethyl-3,6-dimethylpyrazin and/or 2 (or 3)-ethyl-3,5 (or 2,5)-dimethyl-pyrazine
3f) 2-Methoxy-3-(1-methylpropyl)-pyrazine, (2,3-Methoxyisobutylpyrazine)
3g) 4-Vinylguaiacol
3h) 2,5-Dimethyl-4-hydroxy-3(2H)-furanone, (Dimethylhydroxyfuranone-2,5,4,3)
3i) 4-Methyl-5-ethyl-3-hydroxy-2(5H)-furanone, (Methylethylhydroxyfuranone-4,5,3,2)

as well as the following aroma substances of Group 4:
4a) Acetaldehyde
4b) Propionaldehyde
4c) β-Damascenone
4d) 2,3-Pentandione

SUMMARY OF THE INVENTION

Further, the present invention provides an appropriate process for imparting to foodstuffs or other substances an aroma of fresh ground and fresh brewed coffee, wherein the aromatic substances necessary for the aroma impression of fresh brewed or fresh ground coffee are produced in physically separate formulations and are combined or recombined for employment in food stuffs or perfumed products. A multi-component aroma formulation is preferably employed in the inventive process according to the invention.

Preferred embodiments of the invention can be seen from the dependent claims and the following description.

The invention is based upon the determination that the compounds of Group 1 through 4 (see also the following Tables 1 through 4) produce in aroma compositions the aroma profile of fresh ground and fresh brewed coffee.

Group 1: Subcomponent "Compounds with a Free Thiol-Group"

It has now been discovered that for the authentic reproduction of the aroma profile of fresh ground and fresh roasted coffee the compounds 1a through 1e listed in Group 1 are indispensable.

TABLE 1

Aroma substances of Group 1; Aroma substances with a free thiol group

| Number | Substance | FEMA | CAS Number |
|---|---|---|---|
| (1a) | 2,3-Methylfuranthiol | 3188 | 28588-74-1 |
| (1b) | Furfurylthiol | 2493 | 98-02-2 |
| (1c) | Methane thiol | 2716 | 74-93-1 |
| (1d) | 3-Methyl-2-buten-1-thiol (Prenylthiol) | 3896 | 5287-45-6 |
| (1e) | 3,3-Methylthiobutylformiate | 3855 | 50746-10-6 |

Group 2: Subcomponent "Sulfur Containing Aldehyde, Phenol, Thiazoline and Thiazole"

It was discovered that for the authentic reproduction of the aroma profile of fresh ground and fresh roasted coffee the compounds 2a through 2b listed in Group 2 are indispensable.

TABLE 2

Aroma substances of Group 2; Sulfur containing aldehyde, phenol, thiazoline and thiazole

| Number | Substance | FEMA | CAS Number |
|---|---|---|---|
| (2a) | 3-Methylthiopropanal | 2747 | 3268-49-3 |
| (2b) | o-Methylthiophenol (Thioguaiacol) | 3210 | 1073-29-6 |
| (2c) | 2-Acetyl-2-thiazoline (Acetylthiazolin) | 3817 | 29926-41-8 |
| (2d) | 2-Acetylthiazol | 3328 | 24295-03-2 |

Group 3: Base-Notes: Aldehyde, Ketone, Pyrazine, Phenole, Furanone

It was discovered that for the authentic reproduction of the aroma profile of fresh ground and fresh roasted coffee the compounds 3a through 3h listed in Group 3 are indispensable.

TABLE 3

Aroma substances, which contain no sulfur: Aldehyde, Ketone, Pyrazine, Phenole, Furanone

| Number | Substance | FEMA | CAS Number |
|---|---|---|---|
| (3a) | 2-Methylbutanal | 2691 | 96-17-3 |
| (3b) | 3-Methylbutanal | 2692 | 590-86-3 |

TABLE 3-continued

Aroma substances, which contain no sulfur: Aldehyde, Ketone, Pyrazine, Phenole, Furanone

| Number | Substance | FEMA | CAS Number |
|---|---|---|---|
| (3c) | 2,3-Butanedione(diacetyl) | 2370 | 431-03-8 |
| (3d) | 3,5,2-Methyldiethylpyrazine | 3916 | 18138-05-1 |
| (3e) | 2-Ethyl-3,5-dimethylpyrazine, 2-Ethyl-3,6-dimethylpyrazine (2(or 3)-ethyl-3,5(or 2,5)-dimethyl-pyrazine) | 3149 | 13925-07-0 13360-65-1 55031-15-7 |
| (3f) | 2-Methoxy-3-(1-methylpropyl)-pyrazine (2,3-Methoxyisobutylpyrazine) | 3433 | 24168-70-5 |
| (3g) | 4-Vinylguaiacol | 2675 | 7786-61-0 |
| (3h) | 2,5-Dimethyl-4-hydroxy-3(2H)-furanone (2,5,4,3-Dimethylhydroxyfuranone) | 3174 | 3658-77-3 |
| (3i) | 4-Methyl-5-ethyl-3-hydroxy-2(5H)-furanone (4,5,3,2-Methylethylhydroxyfuranone) | 3153 | 698-10-2 |

Group 4: Subcomponent Rounding out Notes: Aldehyde, Norisoprenoid, Ketone

It has now been discovered that for the authentic reproduction of the aroma profile of fresh ground and fresh roasted coffee the compounds 4a through 4d listed in Group 4 are indispensable.

TABLE 4

Aroma substances which contain no sulfur and are necessary for rounding out notes

| Number | Substance | FEMA | CAS Number |
|---|---|---|---|
| (4a) | Acetaldehyde | 2003 | 75-07-0 |
| (4b) | Propionaldehyde | 2923 | 123-38-6 |
| (4c) | β-Damascenone | 3420 | 23696-85-7 |
| (4d) | 2,3-Pentandione | 2841 | 600-14-6 |

Groups 2 through 4 can, beyond this, contain other aromatic substances such as for example dimethyltrisulfide and/or 4,2-furfurylthiopentanone and/or prenylthioacetate and/or vanillin and/or acetylmethylcarbinol and/or 3,4-hexanedione and/or methylcyclohexenolon and/or methylcyclopentenolon and/or 2-methoxy-3-methylpyrazine and/or tetrahydrochinoxaline.

In composition tests, various proportional relationships of the compounds in Groups 1 through 4 were found to exhibit roasted coffee typical aromatic impressions. The character of fresh brewed coffee was achieved in particular by the mixture relationships indicated in Tables 5 through 8.

TABLE 5

Aroma substances of Group 1

| Number | Substance | Part by Weight |
|---|---|---|
| (1a) | 2,3-Methylfuranthiol | 0.4-2.0 |
| (1b) | Furfurylthiol | 1.2-2.2 |
| (1c) | Methane thiol | 40-53 |
| (1d) | 3-Methyl-2-buten-1-thiol (Prenylthiol) | 1.2-3.2 |
| (1e) | 3,3-Methylthiobutylformiate | 0.4-4 |

TABLE 6

Aroma substances of Group 2

| Number | Substance | Part by Weight |
|---|---|---|
| (2a) | 3-Methylthiopropanal | 2.0-2.5 |
| (2b) | o-Methylthiophenol (Thioguaiacol) | 0.1-1.5 |
| (2c) | 2-Acetyl-2-thiazoline (Acetylthiazoline) | 0.1-1.5 |
| (2d) | 2-Acetylthiazole | 0.1-1.5 |

TABLE 7

Aroma substances of Group 3

| Number | Substance | Part by Weight |
|---|---|---|
| (3a) | 2-Methylbutanal | 200-350 |
| (3b) | 3-Methylbutanal | 140-220 |
| (3c) | 2,3-Butanedione(Diacetyl) | 400-520 |
| (3d) | 3,5,2-Methyldiethylpyrazine | 0.2-2.0 |
| (3e) | 2-Ethyl-3,5-dimethylpyrazine, 2-Ethyl-3,6-dimethylpyrazine (2(or 3)-ethyl-3,5(or 2,5)-dimethyl-pyrazine) | 2.1-5.0 |
| (3f) | 2-Methoxy-3-(1-methylpropyl)-pyrazin(2,3-Methoxyiso-butylpyrazine) | 0.1-1.8 |
| (3g) | 4-Vinylguaiacol | 40-140 |
| (3h) | 2,5-Dimethyl-4-hydroxy-3(2H)-furanone,(2,5,4,3-Dimethylhydroxyfuranone) | 220-680 |
| (3i) | 4-Methyl-5-ethyl-3-hydroxy-2(5H)-furanone(4,5,3,2-Methylethylhydroxyfuranone) | 0.5-2 |

TABLE 8

Aroma substances of Group 4

| Number | Substance | Part by Weight |
|---|---|---|
| (4a) | Acetaldehyde | 90-1200 |
| (4b) | Propionaldehyde | 20-180 |
| (4c) | β-Damascenone | 1-5 |
| (4d) | 2,3-Pentandione | 30-360 |

In a preferred embodiment the aroma substances of Group 1 are divided into two subgroups 1.1 and 1.2, wherein the subgroups 1.1 and 1.2 were respectively separately formulated, that is, respectively separately applied to carrier material. Subgroup 1.1 is comprised the following compounds: 2,3-methylfuranthiol (1a), furfurylthiol (1b), 3-methyl-2-butene-1-thiol (prenylthiol) (1d), 3,3-methylthiobutylformate (1e). Subgroup 1.2 included methane thiol (1c).

The quantitative relationship of subgroups 1.1 and 1.2 lie preferably in the range of 1:5 through 1:50, more preferably in the range of 1:10 and 1:30.

Particularly preferred were aroma compositions with the composition indicated in Tables 9 through 12.

TABLE 9

Aroma substance of Group 1

| Number | Substance | Part by Weight |
|---|---|---|
| (1a) | 2,3-Methylfuranthiol | 1.00 |
| (1b) | Furfurylthiol | 2 |
| (1c) | Methane thiol | 40 |

TABLE 9-continued

Aroma substance of Group 1

| Number | Substance | Part by Weight |
|---|---|---|
| (1d) | 3-Methyl-2-buten-1-thiol (Prenylthiol) | 2 |
| (1e) | 3,3-Methylthiobutylformate | 2 |

TABLE 10

Aroma substance of Group 2

| Number | Substance | Part by Weight |
|---|---|---|
| (2a) | 3-Methylthiopropanal | 2 |
| (2b) | o-Methylthiophenol (Thioguaiacol) | 1 |
| (2c) | 2-Acetyl-2-thiazoline (Acetylthiazoline) | 1 |
| (2d) | 2-Acetylthiazol | 1 |

TABLE 11

Aroma substance of Group 3

| Number | Substance | Part by Weight |
|---|---|---|
| (3a) | 2-Methylbutanal | 250 |
| (3b) | 3-Methylbutanal | 150 |
| (3c) | 2,3-Butanedione(Diacetyl) | 400 |
| (3d) | 3,5,2-Methyldiethylpyrazine | 1 |
| (3e) | 2-Ethyl-3,5-dimethylpyrazine, 2-Ethyl-3,6-dimethylpyrazine (2(or 3)-ethyl-3,5(or 2,5)-dimethyl-pyrazine) | 3 |
| (3f) | 2-Methoxy-3-(1-methylpropyl)-pyrazine (2,3-Methoxyisobutylpyrazine) | 1 |
| (3g) | 4-Vinylguaiacol | 50 |
| (3h) | 2,5-Dimethyl-4-hydroxy-3(2H)-furanone, (2,5,4,3-Dimethylhydroxyfuranone) | 300 |
| (3i) | 4-Methyl-5-ethyl-3-hydroxy-2(5H)-furanone(4,5,3,2-Methylethylhydroxyfuranone) | 1 |

TABLE 12

Aroma substance of Group 4

| Number | Substance | Part by Weight |
|---|---|---|
| (4a) | Acetaldehyde | 500 |
| (4b) | Propionaldehyde | 100 |
| (4c) | β-Damascenone | 1 |
| (4d) | 2,3-Pentandione | 100 |

A further preferred aroma mixture comprised the aroma substances indicated in Tables 13 through 16.

TABLE 13

Aroma substance of Group 1

| Number | Substance | Part by Weight |
|---|---|---|
| (1a) | 2,3-Methylfuranthiol | 0.675 |
| (1b) | Furfurylthiol | 1.65 |
| (1c) | Methane thiol | 45.35 |
| (1d) | 3-Methyl-2-buten-1-thiol (Prenylthiol) | 1.65 |
| (1e) | 3,3-Methylthiobutylformiate | 0.75 |

TABLE 14

Aroma substance of Group 2

| Number | Substance | Part by Weight |
|---|---|---|
| (2a) | 3-Methylthiopropanal | 2.2 |
| (2b) | o-Methylthiophenol (Thioguaiacol) | 0.25 |
| (2c) | 2-Acetyl-2-thiazoline (Acetylthiazoline) | 0.25 |
| (2d) | 2-Acetylthiazol | 0.25 |

TABLE 15

Aroma substance of Group 3

| Number | Substance | Part by Weight |
|---|---|---|
| (3a) | 2-Methylbutanal | 310 |
| (3b) | 3-Methylbutanal | 180 |
| (3c) | 2,3-Butanedione(Diacetyl) | 480 |
| (3d) | 3,5,2-Methyldiethylpyrazine | 0.65 |
| (3e) | 2-Ethyl-3,5-dimethylpyrazine, 2-Ethyl-3,6-dimethylpyrazine (2(or 3)-ethyl-3,5(or 2,5)-dimethyl-pyrazine) | 2.40 |
| (3f) | 2-Methoxy-3-(1-methylpropyl)-pyrazine (2,3-Methoxyiso-butylpyrazine) | 0.55 |
| (3g) | 4-Vinylguaiacol | 100 |
| (3h) | 2,5-Dimethyl-4-hydroxy-3(2H)-furanone, (2,5,4,3-Dimethylhydroxyfuranone) | 650 |
| (3i) | 4-Methyl-5-ethyl-3-hydroxy-2(5H)-furanone (4,5,3,2-Methylethylhydroxyfuranone) | 1 |

TABLE 16

Aroma substance of Group 4

| Number | Substance | Part by Weight |
|---|---|---|
| (4a) | Acetaldehyde | 1000 |
| (4b) | Propionaldehyde | 150 |
| (4c) | β-Damascenone | 2 |
| (4d) | 2,3-Pentanedione | 330 |

A further preferred aroma mixture included the aroma substances indicated in Tables 17 through 20.

TABLE 17

Aroma substance of Group 1

| Number | Substance | Part by Weight |
|---|---|---|
| (1a) | 2,3-Methylfuranthiol | 1.5 |
| (1b) | Furfurylthiol | 2.0 |
| (1c) | Methane thiol | 50.0 |
| (1d) | 3-Methyl-2-buten-1-thiol (Prenylthiol) | 3.0 |
| (1e) | 3,3-Methylthiobutylformiate | 3.0 |

TABLE 18

Aroma substance of Group 2

| Number | Substance | Part by Weight |
|---|---|---|
| (2a) | 3-Methylthiopropanal | 2.0 |
| (2b) | o-Methylthiophenol (Thioguaiacol) | 0.5 |
| (2c) | 2-Acetyl-2-thiazoline (Acetylthiazoline) | 0.5 |
| (2d) | 2-Acetylthiazol | 0.5 |

TABLE 19

Aroma substance of Group 3

| Number | Substance | Part by Weight |
|---|---|---|
| (3a) | 2-Methylbutanal | 200 |
| (3b) | 3-Methylbutanal | 200 |
| (3c) | 2,3-Butanedione(Diacetyl) | 500 |
| (3d) | 3,5,2-Methyldiethylpyrazine | 2.0 |
| (3e) | 2-Ethyl-3,5-dimethylpyrazine, 2-Ethyl-3,6-dimethylpyrazine (2(or 3)-ethyl-3,5(or 2,5)-dimethyl-pyrazine) | 4.0 |
| (3f) | 2-Methoxy-3-(1-methylpropyl)-pyrazine (2,3-Methoxyiso-butylpyrazine) | 1.0 |
| (3g) | 4-Vinylguaiacol | 50 |
| (3h) | 2,5-Dimethyl-4-hydroxy-3(2H)-furanone, (2,5,4,3-Dimethylhydroxyfuranone) | 500 |
| (3i) | 4-Methyl-5-ethyl-3-hydroxy-2(5H)-furanone (4,5,3,2-Methylethylhydroxyfuranone) | 2 |

TABLE 20

Aroma substance of Group 4

| Number | Substance | Part by Weight |
|---|---|---|
| (4a) | Acetaldehyde | 250 |
| (4b) | Propionaldehyde | 100 |
| (4c) | β-Damascenone | 2 |
| (4d) | 2,3-Pentandione | 300 |

In surprising manner it was determined that the separate formulation of Group 1 and Groups 2, 3 and 4 according to the scheme in Table 21 lead to a significantly improved stability and shelf life of the coffee aroma in dry application form.

In a particularly preferred embodiment the inventive process is characterized thereby, that the aroma substances of Groups 1 through 4 are combined as separate ingredients A through D to the following combinations I through IV.

TABLE 21

Combination scheme for the separate formulation of the aroma substances in the Groups 1 through 4.

| Combination | A | B | C | D |
|---|---|---|---|---|
| I | Group 1 | Group 2<br>Group 3<br>Group 4 | — | — |
| II | Group 1 | Group 2<br>Group 4 | Group 3 | — |
| III | Group 1 | Group 2 | Group 3<br>Group 4 | — |
| IV | Group 1 | Group 2 | Group 3 | Group 4 |

For the recombination of the separate formulated aroma components A, B, C and D the quantity relationships indicated in Table 22 were found to be particularly preferred for the aroma profile of fresh ground and fresh brewed coffee.

TABLE 22

Combination scheme for the separate formulation of the aroma substances in the Groups 1 through 4. All indications are in parts by weight.

| Combination | Separate Components | | | |
|---|---|---|---|---|
| | A | B | C | D |
| I | 40 to 60 | 1800 to 3300 | — | — |
| II | 40 to 60 | 600 to 1500 | 1400 to 1800 | — |
| III | 40 to 60 | 2 to 6 | 1800 to 3300 | — |
| IV | 40 to 60 | 2 to 6 | 1400 to 1800 | 1600 to 1500 |

It was determined that an aroma composition of this type can impart the aroma of fresh brewed or fresh ground coffee to foodstuffs, for example drinks, instant drinks, sweets, baked goods and fatty fillings aw well as milk products. The term "aroma" is to be so understood herein as comprising "taste" and/or "flavor", that is, the sensorial appreciation. Likewise the term "aromatizing" is to be so understood herein as including "to impart with flavor", such as conferring a taste.

It is surprisingly discovered that the stability of the total aroma mixture, comprised of the combinations I, II, III, IV of components A, B, C, D comprised of Groups 1 through 4, in foodstuff applications is substantially improved by the segregated formulation. The physical separation of the aroma substances of Group 1 from the remaining aroma substances of Groups 2 through 4 is essential for stability. The physical separation of the components A, B, C, D can occur for example in the following formulation systems:

emulsions (for example multiple emulsions)
encapsulation (granulation, extrusion, gelatin capsulation, coacervation, etc.)
application onto carrier substances (plated adsorption)
extrusions
dispersions
molecular inclusion (zeolite, cyclodextrin)
separate condensation
edible films and layers
layer-coatings The production of the components A, B, C, D in encapsulated form can occur as described for example in EP-A 870537, WO-A 00/36931 or EP-A 1099385.

The invention is further concerned with aromatized foodstuffs, which are produced with an aroma system which is based upon the technology of separately formulating.

Preferred is the separation upon solid carrier systems. Appropriately suitable carrier systems for the separate formulation of the components or building blocks A, B, C, D are for example:

Lactose—Dextrose
Maltodextrin
Mannitol
Sorbitol
MgCO$_3$
Silicagel
Microcellulose
Resins (e.g. Damar-resins)
Agar Agar
Gelatins
Molecular powder
Milk powder
Fat powder
Albumin powder
Malt extracts (caramel)
Cellulose
Starches
modified starches
Dextrin
Waxes
Pectins
Schellac
Pigments
Thickeners The components A, B, C, D can be formulated upon the same or different carrier systems. Preferably the same carrier system is employed for all components.

Suitable carrier systems for scenting the room space are polymer carriers on an organic or inorganic basis.

Preferred carrier systems for room space scenting on organic basis are polypropylene carriers (for example those produced by the company Membrana, Accurel MP 1000, microporous polypropylene-powder).

EXAMPLES

Example 1

Instant Drink

Basic Recipe for Instant Drink of the Type Cappuccino

| Component | part by weight |
|---|---|
| Sugar | 345 |
| Low Fat Milk Powder | 291 |
| Soluble Bean Coffee | 210 |
| Lactose | 128 |
| Stabilizer | 26 |
| Inventive Aroma | 0.05-5 |

In this example the aroma impression of fresh roasted and fresh brewed coffee was produced by pouring hot water onto the instant drink mixture, causing simultaneous release of the aroma substances of the individual subcomponents. The aroma is produced in the manner that the components A, B, C, D comprised of substances of Groups 1 through 4 indicated in Table 21 are formulated separately with a carrier system suitable for foodstuffs or for fragrancing purposes. For the use in the instant drink field the combinations indicated in Tables 21 and 22 can now be mixed.

The employment of the described coffee-aroma mixture, consisting of the mixture of separately formulated components A, B, C and D, is of interest not only in application for foodstuffs but also for perfuming. In tests with the described aroma it was surprisingly discovered, that objects, enclosed spaces and building areas could be aromatized with a pleasant fragrance of fresh roasted and fresh brewed coffee.

A further improved embodiment comprises the separation of methane thiol (1c; subgroup 1.2) from the other thiols of subgroup 1.1.

Methane thiol is applied to carriers or encapsulated as a 1 weight % solution with 20-25 weight % loading in a spray granulation.

The methane thiol-containing granulate was combined with the other separate formulated (here encapsulated) thiols of subgroup 1.1 as well as the separate formulated substances of Groups 2.4 into a mixture evoking to a wonderful degree the aroma of fresh roasted coffee.

The advantage of-the separate encapsulation of methane thiol and the other thiols lies in the greater variability of the combinations to be created therefrom. Methane thiol has, in comparison to the other thiol compounds, a significantly greater dosing latitude.

The inventive coffee aroma mixtures were incorporated generally in doses or amounts of 10 g-100 g/100 kg of foodstuff.

Example 2

Room Fragrancing

The aroma components A, B, C and D were respectively applied to a suitable inert carrier material with adsorbent characteristics.

The degree of loading of the liquid ingredient onto the carrier material can be selected to be generally from 1 weight % to 10 weight %.

As the carrier material, there can be employed for example a product produced by the company Membrana, Accurel MP 1000 (microporous polypropylene-powder).

The thus formulated components are recombined in proportions analogous to Tables 21 and 22.

It was discovered that the storage stability of the aromatic formulated according to the above described scheme was significantly higher than the storage stability of a correspondingly mixed liquid aromatic.

In a closed vessel the liquid aroma looses, after 1-2 days, the typical fragrance of fresh brewed, or as the case may be fresh ground coffee, and burned or chemical side notes evolve.

In a closed vessel the inventive formulated aroma maintains over a span of time of at least one month the typical fragrance of fresh brewed or as the case may be fresh ground coffee without formation of disturbing side notes.

The mixture of aroma components A, B, C and D formulated according to the above scheme was tested in the following applications:

1.) Simple Exposure:
Approximately 1 g of the mixture was placed in a flat open vessel and exposed in a closed space. Already after a few seconds a pleasant typical fragrance of fresh brewed or as the case may be fresh ground coffee is noticeable in the air space. Also, after a duration of exposure of eight hours, the air space corresponded to the above-mentioned profile.

2.) Exposure via Cartridge and Air Stream:
Approximately 2 g of the mixture was filled into a plastic cartridge. A pulsed air stream was directed through the cartridge with the aid of a metering or dosing apparatus and vented to the environment. Within closed spaces a punctual and controlled space fragrancing was attempted. It was determined that the following parameters produced, at a distance of 1-3 meters from the metering apparatus, a pleasant fragrance typical of fresh brewed or, as the case may be, fresh ground coffee:
Pulse frequency: 1-2 sec. Air stream, 10-20 sec. Pause
It was discovered that this experiment or design made possible a punctual space fragrancing in the above-described interval of operation over a time period of at least 24 hours.

Depending upon space and environmental parameters (space volume, convection, sideways airflow, etc.) an adaptation of the pulse frequency may become necessary.

3.) Exposure via Double Cartridge and Separate Air Streams:
A mixture of components A, B, C, D formulated according to the above scheme was filled (2-5 g) into a parallel double cartridge in Room 1. In Room 2 only components A and C formulated in accordance with the above scheme were filled (2-5 g in the relationship 1:10-10:1). Through the double cartridge a pulsed air stream was directed individually adjustable for each cartridge as described for 2.) above. Besides any amount of variation of the emitted coffee fragrance, it becomes possible by this device to achieve a significant increase in duration of the coffee fragrance output in comparison to 2.) (approximately 3-5 days in interval operation).

Example 3

Ice Coffee Drink

Basic Recipe of Ice Coffee Instant Drink

| Content | Part by Weight |
| --- | --- |
| Sugar | 787.5 |
| Dextrose | 157.5 |
| Soluble Bean Coffee | 52.5 |
| Inventive Aroma | 0.05-5 |

8 g of this mixture was intensively stirred in 100 ml cold milk (3.5% fat).

Due to the low temperature at composition, ice coffee drinks may fail to deliver a typical taste of fresh brewed coffee. In this example the aroma impression of fresh roasted and fresh brewed coffee was produced upon stirring the aroma containing instant formulation with the milk. The character of the drink with the inventive aroma exhibited a more typical taste in the direction of fresh roasted and fresh brewed coffee than the formulation without the flavor.

The invention claimed is:
1. A multi-component aroma composition for imparting a coffee aroma, including the following aroma substances of Group 1:
   1a) 2,3-methylfuranthiol
   1b) furfurylthiol
   1c) methane thiol
   1d) 3-methyl-2-buten-1-thiol (prenylthiol)
   1e) 3,3-methylthiobutylformiate
as well as, in one or more component or components distinct from the aroma substances of Group 1, the following aroma substances of Group 2:
   2a) 3-methylthiopropanal
   2b) o-methylthiophenol (thioguaiacol)
   2c) 2-acetyl-2-thiazolin (acetylthiazolin)
   2d) 2-acetylthiazol,
the following aroma substances of Group 3:
   3a) 2-methylbutanal
   3b) 3-methylbutanal
   3c) 2,3-butanedione (diacetyl)
   3d) 3,5,2-methyldiethylpyrazine

3e) 2-ethyl-3,5-dimethylpyrazine and/or 2-ethyl-3,6-dimethylpyrazine and/or 2 (or 3)-ethyl-3,5 (or 2,5)-dimethyl-pyrazine
3f) 2-methoxy-3-(1-methylpropyl)-pyrazine, (2,3-methoxyisobutylpyrazine)
3g) 4-vinylguaiacol
3h) 2,5-dimethyl-4-hydroxy-3(2H)-furanone, (2,5,4,3-dimethylhydroxyfuranone)
3i) 4-methyl-5-ethyl-3-hydroxy-2(5H)-furanone, (4,5,3,2-methylethylhydroxyfuranone)
and the following aroma substances of Group 4:
4a) acetaldehyde
4b) propionaldehyde
4c) β-damascenone
4d) 2,3-pentandione.

2. A multi-component aroma composition according to claim 1, wherein there is employed
I the aroma substances of Groups 2, 3 and 4 together in one component or
II the aroma substances of Groups 2 and 4 together in one component and the aroma substances of Group 3 in a separate aroma component or
III the aroma substances of Groups 3 and 4 together in one component and the aroma substances of Group 2 in a separate aroma component or
IV the aroma substances of Group 2 in one component, the aroma substances of Group 3 in a separate component and the aroma substances of Group 4 in yet a further separate component.

3. A multi-component aroma composition according to claim 1, wherein the aroma substances of Group 1 are employed
together in one component or
in two separate components, of which the one component is comprised of the aroma substances
1a) 2,3-methylfuranthiol
1b) furfurylthiol
1d) 3-methyl-2-buten-1-thiol (prenylthiol)
1e) methylthiobutylformiat-3,3
and the other component is comprised of the aroma substance
1c) methane thiol.

4. A multi-component composition according to claim 1, wherein at least one of the employed components of the aroma composition is formulated onto a solid carrier.

5. A multi-component composition according to claim 4, wherein each of the employed components is formulated onto a solid carrier separate from the one or more other employed components, wherein the solid carrier for each employed component is the same.

6. An instant drink mixture comprising the following aroma substances of Group 1:
1a) 2,3-methylfuranthiol
1b) furfurylthiol
1c) methane thiol
1d) 3-methyl-2-buten-1-thiol (prenylthiol)
1e) 3,3-methylthiobutylformiate
as well as, in one or more component or components distinct from the aroma substances of Group 1, the following aroma substances of Group 2:
2a) 3-methylthiopropanal
2b) o-methylthiophenol (thioguaiacol)
2c) 2-acetyl-2-thiazolin (acetylthiazolin)
2d) 2-acetylthiazol,
the following aroma substances of Group 3:
3a) 2-methylbutanal
3b) 3-methylbutanal
3c) 2,3-butanedione (diacetyl)
3d) 3,5,2-methyldiethylpyrazine
3e) 2-ethyl-3,5-dimethylpyrazine and/or 2-ethyl-3,6-dimethylpyrazine and/or 2 (or 3)-ethyl-3,5 (or 2,5)-dimethyl-pyrazine
3f) 2-methoxy-3-(1-methylpropyl)-pyrazine, (2,3-methoxyisobutylpyrazine)
3g) 4-vinylguaiacol
3h) 2,5-dimethyl-4-hydroxy-3(2H)-furanone, (2,5,4,3-dimethylhydroxyfuranone)
3i) 4-methyl-5-ethyl-3-hydroxy-2(5H)-furanone, (4,5,3,2-methylethylhydroxyfuranone)
and the following aroma substances of Group 4:
4a) acetaldehyde
4b) propionaldehyde
4c) β-damascenone
4d) 2,3-pentandione
as well as additional typical components.

7. A foodstuff comprising a sensorially effective amount of a multi-component coffee aroma imparting composition including the following aroma substances of Group 1:
1a) 2,3-methylfuranthiol
1b) furfurylthiol
1c) methane thiol
1d) 3-methyl-2-buten-1-thiol (prenylthiol)
1e) 3,3-methylthiobutylformiate
as well as, in one or more component or components distinct from the aroma substances of Group 1, the following aroma substances of Group 2:
2a) 3-methylthiopropanal
2b) o-methylthiophenol (thioguaiacol)
2c) 2-acetyl-2-thiazolin (acetylthiazolin)
2d) 2-acetylthiazol,
the following aroma substances of Group 3:
3a) 2-methylbutanal
3b) 3-methylbutanal
3c) 2,3-butanedione (diacetyl)
3d) 3,5,2-methyldiethylpyrazine
3e) 2-ethyl-3,5-dimethylpyrazine and/or 2-ethyl-3,6-dimethylpyrazine and/or 2 (or 3)-ethyl-3,5 (or 2,5)-dimethyl-pyrazine
3f) 2-methoxy-3-(1-methylpropyl)-pyrazine, (2,3-methoxyisobutylpyrazine)
3g) 4-vinylguaiacol
3h) 2,5-dimethyl-4-hydroxy-3(2H)-furanone, (2,5,4,3-dimethylhydroxyfuranone)
3i) 4-methyl-5-ethyl-3-hydroxy-2(5H)-furanone, (4,5,3,2-methylethylhydroxyfuranone)
and the following aroma substances of Group 4:
4a) acetaldehyde
4b) propionaldehyde
4c) β-damascenone
4d) 2,3-pentandione.

8. A process for imparting to an article an aroma of fresh ground and fresh brewed coffee, wherein the aroma substances necessary for producing the aroma impression of fresh brewed or fresh ground coffee are produced in physically separated formulations and are combined or recombined for use, wherein aroma substances of Groups 1 through 4 are employed:
1) Group 1, containing 2,3-methylfuranthiol, furfurylthiol, methanthiol, 3-methyl-2-buten-1-thiol and methylthiobutylformiat-3,3;
2) Group 2, containing 3-methylthiopropanal, o-methylthiophenol, 2-acetyl-2-thiazoline and 2-acetylthiazol;

3) Group 3, containing 2-methylbutanal, 3-methylbutanal, 2,3-butanedione (diacetyl), 3,5,2-methyldiethyl-pyrazine, 3,2-dimethylethylpyrazine, 2-methoxy-3-(1-methylpropyl)-pyrazine, 4-vinylguaiacol, 2,5-dimethyl-4-hydroxy-3(2H)-furanone and 4-methyl-5-ethyl-3-hydroxy-2(5H)-furanone;

4) Group 4, containing acetaldehyde, propionaldehyde, β-damascenone and 2,3-pentandione, wherein the aroma substance of Group 1 is produced in formulations physically separated from the aroma substances of Groups 2, 3 and 4.

9. A process according to claim 8, wherein the aroma substances of Groups 1 through 4 are combined as separate components A through D according to the following combinations I through IV:

| Combination | Separate Components | | | |
|---|---|---|---|---|
| | A | B | C | D |
| I | Group 1 | Group 2<br>Group 3<br>Group 4 | — | — |
| II | Group 1 | Group 2<br>Group 4 | Group 3 | — |
| III | Group 1 | Group 2 | Group 3<br>Group 4 | — |
| IV | Group 1 | Group 2 | Group 3 | Group 4. |

* * * * *

UNITED STATES PATENT AND TRADEMARK OFFICE
CERTIFICATE OF CORRECTION

PATENT NO.         : 7,316,826 B2                                        Page 1 of 1
APPLICATION NO.    : 10/484229
DATED              : January 8, 2008
INVENTOR(S)        : Guenter Kindel et al.

It is certified that error appears in the above-identified patent and that said Letters Patent is hereby corrected as shown below:

Column 1, line 30, replace "on the these" with --on the--

Column 2, line 46, replace "und/or" with --and/or--

Column 9, line 22, replace "aw" with --as--

Signed and Sealed this

Twenty-sixth Day of August, 2008

JON W. DUDAS
*Director of the United States Patent and Trademark Office*